United States Patent Office 3,023,758
Patented Mar. 6, 1962

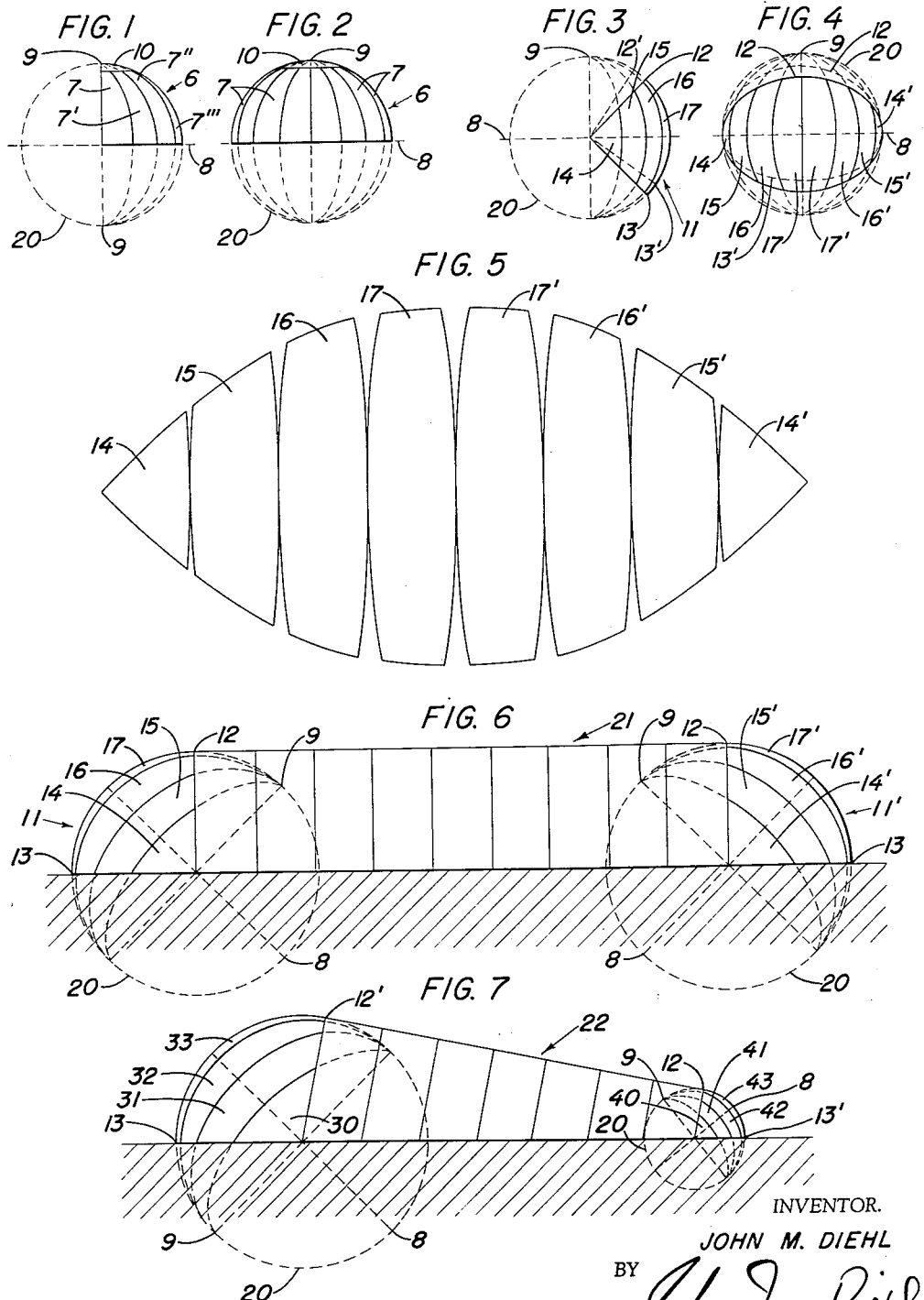

3,023,758
METHOD OF MAKING AN END FOR AN AIR SUPPORTED STRUCTURE
John M. Diehl, Madison, Wis., assignor to Griffolyn Company, Inc., Madison, Wis., a corporation of Delaware
Filed Apr. 14, 1958, Ser. No. 728,398
7 Claims. (Cl. 135—1)

This invention relates to a method of making an end for an air supported structure and more particularly to the method of making an end for an air supported structure using truncated lunar sections.

The end for an air supported structure is generally composed of the outside surface of substantially one quarter of a sphere. Heretofore the aforementioned outside surface of one quarter of a sphere has been obtained by the following methods.

A sphere has been bisected on its equatorial line to give two equal symmetrical half spheres. In turn the sphere has been again bisected through two diametrically opposing points of the sphere whose join was perpendicular to the equatorial plane, said points better known as poles of the equator, to give four equal symmetrical quarter sections of a sphere. Each one of the aforementioned outside surfaces of one quarter of a sphere properly oriented were used to provide an end for an air supported structure and each quarter has been comprised essentially of longitudinally extending lunar sections. The longitudinally extending lunar sections had their base at the equatorial line of a sphere and extended from the equatorial line of the sphere to converge and terminate at an imaginary polar point of the equatorial plane. As the longitudinal lunar sections of the aforementioned quarter of the outside surface of a sphere converged at the imaginary pole there always has been a corresponding concentration of seams at the polar point.

In using the above mentioned method of obtaining a quarter of the outside surface of a sphere, that is, cutting longitudinally converging lunar sections, it is readily seen that there are many difficulties to overcome and many inherent disadvantages to cope with.

Perhaps the greatest disadvantage in making an end for air supported structures as mentioned above is the tremendous waste of material caused through cutting and shaping the lunar sections. The percentage of material lost through cutting and shaping varies in accordance with the individual cutting job and waste material may be in excess of twenty five percent and as high as forty five percent. When the end for an air supported structure is cut from a single solid piece of material the ends of the lunar sections may be alternated as they are laid side by side to thereby minimize waste. This method of cutting sections for an end of an air supported structure has resulted in cutting waste of approximately thirty percent, however if the end sections are cut from rectangular strips of material the waste material may increase to as high as forty five percent scrap or waste material. It can be seen that cutting an end for an air supported structure by either of the above mentioned methods has always resulted in a great deal of waste material and thereby has proven to be very uneconomical.

In addition to the waste involved it has always been a distinct disadvantage to have the seams become concentrated at the imaginary pole due primarily to the bunching of the material and the accompanying weakening of that section. Many times it has been necessary to patch this terminal point to provide extra strength and beauty.

Another major disadvange of cutting lunar sections for an end for an air supported building such as the end heretofore proposed has been the difficulty of obtaining a proper joinder of the various pie shaped sections.

Therefore, an object of the present invention is to provide an end for air supported structures which will result in a substantial saving in material used in construction of an air supporting structure.

Another object is to provide an end for air supported structures that has uniform strength throughout.

Another object is to provide an end for air supported structures that will eliminate concentration or bunching of seams and therefore need not be reinforced at any of the terminal points of the seams.

Another object is to provide an end for air supported structures which is more economical of construction than any end construction heretofore proposed.

Another object is to provide an end for air supported structures which it not bulky at any point and from an aesthetic and practical standpoint is superior to all prior ends for air supported structures heretofore proposed.

Further objects will become apparent from the drawings and from the following detailed description in which it is intended to illustrate the applicability of the invention without thereby limiting it to a scope less than that of all equivalents which will be apparent to one skilled in the art, and wherein like reference numerals refer to like parts and in which:

FIGURE 1 shows a side elevation of an embodiment of a prior end for air inflated structures;

FIGURE 2 shows an end elevation of the embodiment of FIGURE 1;

FIGURE 3 shows an elevation of a sphere comprising an embodiment of my invention;

FIGURE 4 is another elevation of the embodiment of my invention shown in FIGURE 3;

FIGURE 5 shows a development of the surface of the embodiment shown in FIGURE 4;

FIGURE 6 shows an elevation of an air supported structure showing an embodiment of my invention; and FIGURE 7 shows an elevated view of another embodiment of my invention.

Referring now more particularly to the drawings, FIGURE 1 shows a side view of an end of an air supported structure as it has appeared prior to my invention. The end designated generally as 6 comprises essentially the outer shell of one quarter of a sphere 20 obtained by bisecting a sphere 20 at the equatorial plane to give two equal half spheres and in turn bisected through two opposing points 9 of the sphere whose joint is perpendicular to the equatorial plane to provide four equal symmetrical quarter spheres. Any one of the above mentioned quarters of a sphere 20 properly oriented will provide the quarter sphere designated generally as 6. Quarter sphere 6 is composed of longitudinally extending lunar sections designated as 7, 7′, 7″, and 7‴ which extend from the base equatorial plane 8 of a sphere 20 to converge and terminate at a point 9 which is the imaginary pole of equatorial plane 8 of sphere 20. End 6 has a reinforcing arc shaped cap of material 10 at terminating point 9 of longitudinally extending lunar sections 7, 7′, 7″ and 7‴ for purposes of adding strength to terminal point 9 which point 9 is heavily concentrated with seams from terminating ends of the aforementioned lunar sections 7, 7′, 7″ and 7‴.

FIGURE 2 is a side view of the embodiment shown in FIGURE 1.

As in FIGURE 1 longitudinally extended lunar sections 7, extend from equatorial plane 8 of a sphere 20 to converge and terminate at a point 9 which is the imaginary pole of the equatorial plane 8 of a sphere 20.

Also as in FIGURE 1 end 6 has a reinforcing arc shaped cap of material 10 at terminating point 9 of longitudinally extending lunar sections 7, for purpose of adding strength to terminal point 9.

FIGURE 3 shows an elevation of the outer shell of substantially the one quarter of a sphere comprising my invention. My invention is shown as substantially one quarter of a sphere 20 situated partially above and partially below equatorial plane 8 of sphere 20. As mentioned above in connection with FIGURES 1 and 2 the end of an air supported structure prior to my invention has been composed of a quarter of the outer shell of a sphere 6 obtained by bisecting a sphere 20 along its equatorial plane 8 and again bisecting the sphere through two diametrically opposing points, which have their join perpendicular to the equatorial plane 8 of a sphere.

However, my invention designated generally as 11 in FIGURE 3 comprises the outer shell of approximately one quarter of a sphere obtained by bisecting a sphere 20 through polar points 9 to obtain two symmetrical half spheres. One of the half spheres in turn is then cut along a plane designated as 12 or 12' which forms an angle which extends approximately 45 degrees above equatorial plane 8 and along plane 13 or 13' which plane 13 or 13' will then form an angle of approximately 45 degrees below equatorial plane 8. Cutting a portion of a sphere 20 as indicated above will provide a portion 11 of the outer shell of a sphere 20 which is equivalent to approximately one quarter of a sphere. The portion of sphere 20 indicated generally as 11 is my invention which as shown is composed of truncated lunar sections 14, 15, 16 and 17. Truncated lunar sections 14, 15, 16 and 17 extend between angular planes 12 or 12' and 13 or 13' above and below respectively of equatorial plane 8, and the edge of each section 14, 15, 16 and 17 corresponds to a truncated portion of a line or longitude. As longitudinally extending truncated lunar sections 14, 15, 16, and 17 are joined at the edges thereof to one another in a plurality of seams each seam becomes a truncated portion of a line of longitude. Sections 14, 15, 16 and 17 when joined may provide a shell having substantially the form of one quarter of a sphere, which quarter extends above and below the equatorial plane 8 of sphere 20.

I have described my invention as approximately one quarter of the outer shell of a sphere because as illustrated in FIGURE 3, the upper and lower limits of my truncated lunar sections 14, 15, 16, and 17 extend between plane 12 or 12' which is 45 degrees or more as illustrated by plane 12' above imaginary equatorial plane 8 and plane 13 or 13' which is 45 degrees or less as illustrated by plane 13' below equatorial plane 8. If the truncated lunar portions illustrated above extended exactly 45 degrees above equatorial plane 8 and exactly 45 degrees below equatorial plane 8 it would then comprise exactly one quarter of the outer shell of a sphere.

FIGURE 4 is an elevation of the embodiment of my invention shown in FIGURE 3. The portion of a sphere 20 comprising my invention consists of longitudinally extending truncated lunar sections 14, 15, 16 and 17 and 14', 15', 16' and 17', which extend between plane 13 or 13' situated below equatorial plane 8 and plane 12 or 12' situated above equatorial plane 8. The truncated lunar sections above mentioned are joined at the edges thereof to one another in a plurality of seams wherein each seam is a portion of a line of longitude, to provide substantially the form of the outer shell of one quarter of sphere 20.

FIGURE 5 shows a development of the surface of the embodiment shown in FIGURE 4. Truncated lunar sections 14, 15, 16 and 17, and 14', 15', 16' and 17' are laid out to illustrate how the end portion of an air inflated structure looks before the truncated lunar sections 14, 15, 16, 17 and 14', 15', 16' and 17' are joined to provide the end for an air supported structure as illustrated in FIGURE 4. As can be seen the material wasted in cutting the end comprising my invention is negligible and in no case should the waste exceed five percent. Contrasting the waste of my invention with the waste caused by cutting an end for an air supported structure as ends heretofore have been cut results in a tremendous savings by the use of my invention.

FIGURE 6 shows an elevation of an air supported structure showing an embodiment of my invention shown in FIGURE 4 and is designated generally as 11. The ends 11 and 11' of the air inflated structure 21 are composed of truncated longitudinally extending lunar sections 14, 15, 16 and 17 and sections 14', 15', 16' and 17' which above mentioned sections extend as portions of a line of longitude. When the truncated lunar portions 14, 15, 16 and 17 are extended and joined at the seams thereof the form of substantially one quarter of a sphere 20 as shown in FIGURE 4 is obtained. This is also true of sections 14', 15', 16' and 17'. The portions 11 and 11' each consist of substantially one quarter of sphere 20 and each extends partially above equatorial plane 8 to plane 12 and partially below equatorial plane 8 to plane 13. It is noted in FIGURE 6 the lunar sections do not converge and terminate at point 9 as in prior ends for air supported structures, as mentioned and shown in FIGURES 1 and 2, but instead the lunar sections are truncated on both the lower plane 13 and the upper plane 12 thereby providing an end of longitudinally extending truncated lunar sections which are joined at the edge thereof in a plurality of seams wherein each seam is a portion of a line of longitude and in which each series of sections have the form of substantially one quarter of sphere 20.

FIGURE 7 is an elevation of an air supported structure showing another embodiment of my invention. As shown air supported structure 22 is comprised of two ends, one of which is larger than the other. The left end of the air supported structure being larger than the right end. In order to make the end shown on the left, the longitudinally extending truncated lunar sections 30, 31, 32 and 33 are extended substantially in excess of 45 degrees above equatorial plane 8 of sphere 20, and approximately 45 degrees below equatorial plane 8 of sphere 20. My invention shown as the left end portion of air supported structure 22 is substantially of the form of the outer shell of one quarter of sphere 20, however as it is composed of lunar sections which extend approximately 45 degrees below equatorial plane 8 to plane 13 and in excess of 45 degrees above aquatorial line 8 to line 12', it is therefore not exactly in the form of the outside shell of quarter of a sphere 20 but in fact is in excess of the outside surface of one quarter of a sphere 20.

The end shown on the right of air supported structure 22 is substantially smaller than the left end and is therefore made by using substantially shorter truncated lunar sections 40, 41, 42 and 43 and as shown the longitudinally extending truncated lunar sections of my invention have substantially the form of the outer shell of one quarter of sphere 20. As shown in FIGURE 7 the truncated lunar sections extend approximately 45° above equatorial plane 8 to plane 12 and substantially less than 45 degrees below equatorial plane 8 to plane 13'. The end shown on the right of air inflated structure 22 is therefore not exactly in the form of the outer shell of one quarter of sphere 20 but in fact is substantially less than one quarter of sphere 20.

While certain modifications and embodiments of the invention have been described, it is of course to be understood that there are a great number of variations which will suggest themselves to anyone familiar with the subject matter thereof and it is to be distinctly understood that this invention should not be limited except by such limitations as are clearly imposed in the appended claims.

I claim:

1. A portion of a gas supported structure which consists of a thin flexible material having substantially the form of one quarter of a spherical shell, said quarter situated above and below the equatorial plane of a sphere, said shell comprising a plurality of longitudinally extending portions joined at the edges thereof to one another in a plurality of seams wherein each seam corresponds to a portion of a line of longitude, said longitudinally extending portions, each being a truncated lunar section, being situated so as to extend above and below said equatorial plane.

2. A portion of a gas supported structure which consists of a thin flexible material having the form of the outer shell of one quarter of a sphere, said outer shell of substantially the form of one quarter of a sphere being defined by planes which intersect at the equatorial axis of said one quarter of a sphere, said outer shell situated above and below the horizontal equatorial plane of said one quarter of a sphere and said outer shell comprising a plurality of truncated lunar sections joined at the edges thereof to one another in a plurality of seams wherein each seam corresponds to a portion of a line of longitude.

3. A portion of an air inflated structure as in claim 2 further characterized by said outer shell of substantially a quarter of a sphere being situated 45 degrees above and 45 degrees below said equatorial plane of said sphere.

4. A portion of a gas supported structure which consists of a thin flexible material having substantially the form of a section of a spherical shell, said section situated above and below the equatorial plane of a sphere, said shell comprising a plurality of longitudinally extending portions joined at the edges thereof to one another in a plurality of seams wherein each seam corresponds to a portion of a line of longitude, said longitudinally extending portions, each being a truncated lunar section, being situated so as to extend above and below said equatorial plane.

5. A portion of a gas supported structure which consists of a thin flexible material having the form of the outer shell of a section of a sphere, said outer shell of substantially the form of a section of a sphere being defined by planes which intersect at the equatorial axis of said section of a sphere, said outer shell situated above and below the horizontal equatorial plane of said section of a sphere and said outer shell comprising a plurality of truncated lunar sections joined at the edges thereof to one another in a plurality of seams wherein each seam corresponds to a portion of a line of longitude.

6. A portion of a gas supported structure as in claim 5 further characterized by said section being situated in excess of 45 degrees above and 45 degrees below said equatorial plane of said sphere.

7. A portion of a gas inflated structure as in claim 5 further characterized by said section being situated less than 45 degrees above and 45 degrees below said equatorial plane of said sphere.

References Cited in the file of this patent
UNITED STATES PATENTS

| | | |
|---|---|---|
| 1,302,182 | Lanchester | Apr. 29, 1919 |
| 2,731,055 | Smith | Jan. 17, 1956 |
| 2,921,592 | Mackey | Jan. 19, 1960 |